United States Patent [19]

Abubakari et al.

[11] Patent Number: 4,532,318

[45] Date of Patent: Jul. 30, 1985

[54] PROCESS FOR REMOVING TRACE AMOUNTS OF HYDRAZINE

[75] Inventors: Allassan Abubakari, San Jose; Alfred H. Holstein, Los Altos, both of Calif.

[73] Assignee: Syntex (U.S.A.) Inc., Palo Alto, Calif.

[21] Appl. No.: 647,947

[22] Filed: Sep. 5, 1984

[51] Int. Cl.$^3$ .................. C08F 6/00; C08G 00/00; C08J 3/00
[52] U.S. Cl. .................. 528/483; 526/264
[58] Field of Search .................. 528/483; 526/264

[56] References Cited

U.S. PATENT DOCUMENTS 2,914,516  11/1959  Siggia et al. .................. 528/483

FOREIGN PATENT DOCUMENTS 1645642  7/1972  Fed. Rep. of Germany ...... 526/264

OTHER PUBLICATIONS

J. Am. Chem. Soc. 31 (1909), p. 790; "On The Oxidation of Hydrazine", Browne et al.

*Primary Examiner*—Paul R. Michl
*Assistant Examiner*—S. Babajko
*Attorney, Agent, or Firm*—Charles L. Hartman; Tom M. Moran; Alan M. Krubiner

[57] ABSTRACT

A method for removing trace amounts of contaminating hydrazine from pharmaceutical grade PVP. An aqueous solution of PVP is contacted with a gaseous stream containing ozone for a period of time sufficient to remove the hydrazine.

4 Claims, No Drawings

PROCESS FOR REMOVING TRACE AMOUNTS OF HYDRAZINE

BACKGROUND OF THE INVENTION

This invention relates to methods of removing small amounts of hydrazine from a substance.

Poly(N-vinyl-2-pyrrolidinone) (PVP), also known generically as povidone, is widely used in the medical and food industries. See, for example, Kirk, Othmer *Encyclopedia of Chemical Technology,* Third Edition, Vol. 23, 1983, John Wiley & Sons, p. 966–979, and *The Handbook of Water Soluble Gums and Resins* by Robert L. Davidson, 1980, McGraw-Hill. PVP is a polyamide that possesses unusual complexing and colloidal properties and is physiologically inert. Several grades are manufactured and sold under a variety of trade names.

PVP was first developed in Germany during the 1930's and was widely used by the Germans as a blood plasma extender during World War II. It has since been used in a variety of other pharmaceutical applications because of its outstanding properties.

Hydrazine ($N_2H_4$) is a dibasic compound having a strong odor resembling that of ammonia. It is a strong reducing agent and easily forms derivatives of many organic compounds. It can be determined by well known chromatographic techniques, such as those discussed in *Canadian J. Pharm. Sci.* 16 (1981) p 15–19.

A sensitive new generation of analytic instrumentation has allowed the detection of trace amounts of hydrazine in pharmaceutical grade PVP. It would be advantageous to reduce the amount of hydrazine in PVP to below the limits of detectability with available analytic instruments.

A suitable removal method is characterized by four features. First, the method should not take much time; second, it should not add new impurities; third, all detectable hydrazine should be removed; and fourth, the PVP should not be deleteriously modified.

A method that satisfies the above four criteria is contacting the contaminated PVP with ozone, since it is known that ozone readily reacts with hydrazine, see *J. Am. Chem. Soc.* 31 (1909) p. 790. Such a method rapidly removes the hydrazine while adding no new contaminants, since the reaction products of hydrazine and ozone are water, molecular oxygen and molecular nitrogen.

SUMMARY OF THE INVENTION

This invention provides a method for removing trace amounts of hydrazine from PVP. An aqueous solution of PVP is contacted with a gaseous stream containing ozone for a period of time necessary to remove detectable amounts of hydrazine. The hydrazine free substance is then dried.

In another aspect, this invention provides a pharmaceutical grade PVP in a molecular weight range of 5,000 to 50,000 daltons having less than ten parts per billion (ppb) hydrazine.

DETAILED DESCRIPTION

PVP for pharmaceutical use must meet extremely rigid specifications. Pharmaceutical grades of PVP were analyzed by chromatographic means and, surprisingly, many of the samples tested, but not all, were contaminated with small, but detectable, amounts of hydrazine. Some samples having higher molecular weights has no detectable amounts of hydrazine. Although the source of hydrazine is presently not known, one possibility could be the catalyst used to initiate the polymerization reaction that yields medium range molecular weight PVP. The catalyst generally used is a mixture of hydrogen peroxide and ammonia, which are known to create hydrazine under some reaction conditions. Although hydrazine is present in only trace amounts, the removal of hydrazine is desirable. "Trace amounts", as used herein, refers to amounts of less than one part per million (ppm).

Analyzing for less than one ppm hydrazine is relatively difficult. The hydrazine must be derivatized with an aromatic aldehyde to be easily detected by its ultraviolet absorbence in low concentrations. We have found use of high pressure liquid chromatograph techniques allows a reliable detection method for low concentrations of hydrazine.

A variety of methods to remove the hydrazine were tried and found wanting. We attempted to remove hydrazine from the PVP by placing the PVP into an aqueous solution and boiling it, since hydrazine has a high enough vapor pressure to escape from the boiling water. When a sample of PVP was boiled until the PVP started to degrade, the hydrazine was still present in nearly the original quantity. At attempted oxidation of an aqueous solution of PVP with air failed since air does not contain sufficient oxidizing power to remove all the hydrazine. The use of hydrogen peroxide without the addition of a catalytic amount of base took too long. The addition of base was avoided since it would be a new contaminant.

Passing a gaseous stream of ozone, at atmospheric pressure and ambient temperature, through the aqueous solution of PVP proved to work satisfactorily well. The ozone oxygen solution is then passed into the aqueous solution of PVP. The hydrazine is removed after at least 15 minutes.

Hydrazine Determination by Liquid Chromatography

Salicylaldazine, the reference standard, was prepared by dissolving 300 ml of hydrazine sulphate ($N_2H_2 \cdot H_2SO_4$) in five milliliter (ml) of water. One ml of glacial acetic acid and 2 ml of salicylaldehyde solution consisting of 2 ml of salicylaldehyde diluted to 10 ml with isopropyl alcohol were added. After the yellow precipitate formed, the reaction mixture was extracted with two 15 ml portions of methylene chloride, which were dried over sodium sulphate and evaporated to dryness. Salicylaldazine was recrystallized from a warm solution of 60% toluene and 40% methanol with cooling. The filtered dried product had a melting point of 213°–214° C. This material was then used to prepare an external reference standard by forming a methanol solution.

SAMPLE PREPARATION

All samples of PVP were prepared for high pressure liquid chromatography using the same method.

Samples of PVP were dissolved in an adequate amount of a solution of 80% 0.1 N HCl and 20% methanol. The samples were mixed for about 20 minutes and then filtered and diluted with 20% methanol by volume.

A salicylaldehyde solution was prepared by dissolving 1 ml of salicylaldehyde in 9 ml of isopropyl alcohol. This solution should be prepared freshly each day.

Ion exchange columns were prepared with one gram of Dowex, 50 W-X8 cation exchange resin. The samples were passed through the ion exchange column and washed with mobil phase of 80% 0.1 N HCl and 20% methanol. Any hydrazine in the sample solutions was retained on the column. The retained hydrazine was then eluted from the column with 20 ml of 5% aqueous KCl solution. This eluent was then derivatized with 1 ml of the previously made salicylaldehyde solution.

This mixture was stirred and heated to 40° C. for 30 minutes. The reaction mixture was then extracted with two 10 ml samples of methylene chloride, and the methylene chloride was dried over anhydrous sodium sulphate and evaporated to dryness. The dried sample was reconstituted with 1 ml of methanol and analyzed by high pressure liquid chromatography with a Varian C-18, 5 $\mu$ having a mobile phase of 45% water, with 1% acetic acid, and 55% acetonitrile, with a sampleflow rate of 1.0 ml/minute. The UV detector was preset of 355 nanometers. The dilution of the final preparation was adjusted to reflect the sample size and concentration of hydrazine present in the samples where the amount of hydrazine was known or could be guessed at. The ideal hydrazine concentration for the sample in the standard is between 1 and 10 micrograms per milliliter.

Boiling PVP Solutions

Two 25 ml solutions, A and B respectively, were prepared by weighing 1.32 grams and 1.52 grams of PVP K29 into two 100 ml round bottom flasks. 25 ml of deionized water added to each flask dissolved the PVP completely. Solution A was the control. Solution B was heated to boiling and the volume allowed to be reduced until 5 ml of the solution was left. 20 ml of water was then added to make up 25 ml of solution. Solutions A, B and a method blank were analyzed for hydrazine as above. Solution B had turned light yellowish after boiling indicating extensive degradation of the PVP. This color persisted after the additional 20 ml of water was added.

Sample A showed about 464 ppb hydrazine. Sample B showed about 200 ppb hydrazine or a 56.8 degradation of hydrazine present.

Removal of Hydrazine By Air 10.36 grams of K29 PVP were weighed into a 500 ml round bottom flask and dissolved in 200 ml of a solution of 20% methanol and 80% 0.1 M HCl solution and left to stand overnight. Two 20 ml portions were pipetted into 2 Erlinmeyer flasks. One flask was analyzed directly by the hydrazine detection method described. The other flask was air blown for about 4 hours and then analyzed by the same method. In the air blown flask, about 29.4% of the hydrazine detected in the control flask had been degraded.

Removal of Hydrazine by Hydrogen Peroxide 5 to 8 drops of 30% aqueous hydrogen peroxide were added to the remaining 160 ml of the solution prepared in the above example and the solution was heated to about 45°-50° C. After 4 hours, most of the hydrazine still remained.

Removal of Hydrazine By Ozonolisis

Four test samples were made up. Sample A contained 1.37 grams (g) of K29 PVP dissolved in 20 ml of deionized water. Sample B contained 1.17 g of PVP dissolved in 20 ml of deionized water. Sample C contained 20 ml of a 1 ppm of a standard solution. Sample D was a method blank.

Sample A was assayed directly. Samples B, C and D were ozonolized. Ozone was generated by a conventional Welsbach Ozonator (Welsbach Corp.) style T-816, at 90 AC volts producing an ozone rate of 115 liters per minute. Ozone was bubbled through Sample B for ½ hour while the flask was in an ice bath. Sample C was ozonolized for ½ hour and derivatized using a few drops of acetic acid and dilute salicylaldehyde.

Sample A showed 204.7 ppb hydrazine. Sample B showed no detectable hydrazine at this dilution. Sample C showed no detectable hydrazine. When Sample B was concentrated down to 1 ml and most of the excess salicylaldehyde was removed, it was again chromatographed. This chromatograph indicated there had been 5.3 ppb of hydrazine in Sample B. Therefore, the initial ozonolysis had degraded at least 99.7% of the hydrazine present in Sample B.

What is claimed is:

1. A method for removing trace amounts of hydrazine from pharmaceutical grade PVP comprising: contacting an aqueous solution of PVP with a gaseous ozone stream for a period of time required to remove detectable amounts of hydrazine.

2. The method of claim 1 wherein said period of time is at least 15 minutes.

3. The method of claim 1 wherein the detectable amount of hydrazine is 10 ppb.

4. The method of claim 1 wherein said aqueous solution is at substantially atmospheric pressure and ambient temperature.

* * * * *